US006319994B2

(12) United States Patent
Scholl et al.

(10) Patent No.: US 6,319,994 B2
(45) Date of Patent: Nov. 20, 2001

(54) SOLUTION RUBBERS CONTAINING HYDROXYL GROUPS

(75) Inventors: Thomas Scholl, Gladbach; Ulrich Eisele, Leverkusen; Jürgen Trimbach, Köln; Stefan Kelbch, Much, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/833,160

(22) Filed: Apr. 11, 2001

Related U.S. Application Data

(62) Division of application No. 09/350,261, filed on Jul. 8, 1999.

(30) Foreign Application Priority Data

Jul. 18, 1998 (DE) .............................. 198 32 458
Jul. 18, 1998 (DE) .............................. 198 32 459

(51) Int. Cl.$^7$ ...................................... C08F 8/34
(52) U.S. Cl. ............................ 525/333.5; 525/332.9; 525/350; 525/524; 525/575; 525/418; 525/427; 525/750
(58) Field of Search ......................... 524/418, 427, 524/442, 457, 492, 493, 495, 496, 500, 515, 575, 742, 575.5, 750; 525/332.6, 333.5, 332.9, 345, 350, 384; 528/800

(56) References Cited

U.S. PATENT DOCUMENTS

| 3,842,111 | 10/1974 | Meyer-Simon et al. | 260/448 E |
|---|---|---|---|
| 3,873,489 | 3/1975 | Thurn et al. | 260/33.6 AQ |
| 3,978,103 | 8/1976 | Meyer-Simon et al. | 260/448.8 R |
| 3,997,356 | 12/1976 | Thurn et al. | 106/288 Q |
| 4,076,550 | 2/1978 | Thurn et al. | 106/288 Q |
| 5,070,150 | 12/1991 | Hopper | 525/350 |
| 5,189,109 | 2/1993 | Imai et al. | 525/296 |
| 5,227,425 | 7/1993 | Rauline | 524/493 |
| 5,409,969 | 4/1995 | Hamada | 523/213 |
| 5,496,883 | 3/1996 | Hamada | 524/492 |
| 5,663,226 | 9/1997 | Scholl et al. | 524/262 |

FOREIGN PATENT DOCUMENTS

| 2186060 | 3/1997 | (CA) . |
|---|---|---|
| 4435311 | 4/1996 | (DE) . |
| 0 806 452 | 11/1997 | (EP) . |
| 1575115 | 9/1980 | (GB) . |

Primary Examiner—Edward J. Cain
Assistant Examiner—K Wyrozebski-Lee
(74) Attorney, Agent, or Firm—Joseph C. Gil; Noland J. Cheung

(57) ABSTRACT

The invention relates to rubber blends containing said at least one solution-polymerized rubber containing hydroxyl groups, synthesized from diolefins and vinylaromatic monomers, wherein said at least one solution-polymerized rubber containing hydroxyl groups contain in the region of 0.1 to 5 wt. % of bonded hydroxyl groups, to a process for their preparation and to their use for the production of all kinds of moldings.

5 Claims, 1 Drawing Sheet

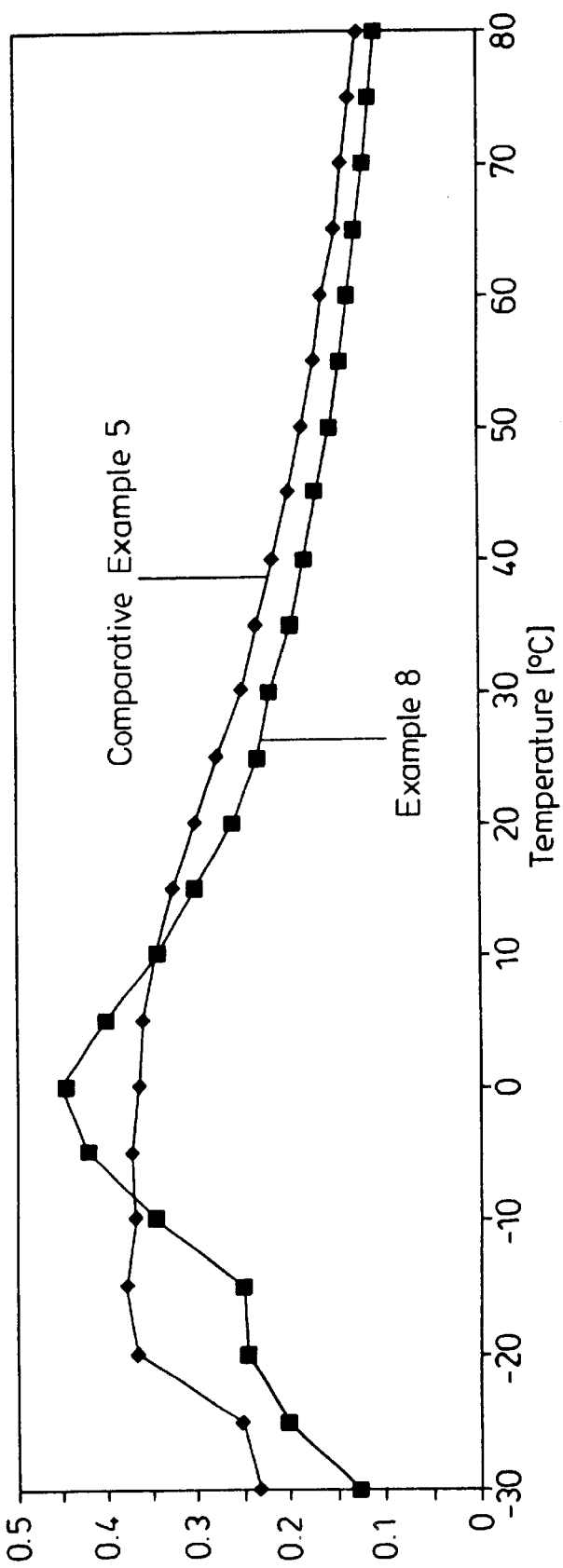

SOLUTION RUBBERS CONTAINING HYDROXYL GROUPS

This application is a divisional application of U.S. Ser. No. 09/350,261 which was filed on Jul. 8, 1999.

FIELD OF THE INVENTION

The present invention relates to rubber blends containing solution-polymerized rubbers with a hydroxyl group, especially primary, content of 0.1 to 5 wt. %, and their mixtures with fillers, optionally other rubbers and rubber aids, and to vulcanized products manufactured therefrom. The rubber blends according to the present invention are suitable for the production of highly reinforced, abrasion-resistant moldings, especially for the manufacture of tires which have a particularly high wet grip.

BACKGROUND OF THE INVENTION

Compared with corresponding emulsion rubbers, anionically polymerized solution rubbers containing double bonds, such as solution polybutadiene and solution styrene/butadiene rubbers, have advantages in the manufacture of tire treads with a low rolling resistance. The advantages lie inter alia in the ability to control the vinyl content and the associated glass transition temperature and the molecular branching. This gives rise in practical use to particular advantages in the relationship between the wet grip and the rolling resistance of the tire. Thus, U.S. Pat. No. 5,227,425 describes the manufacture of tire treads from a solution SBR and silica. Numerous methods of end group modification have been developed to improve the properties further, e.g., with dimethylaminopropylacrylamide as described in EP-A 334,042 or with silyl ethers as described in EP-A 447,066. Because of the high molecular weight of the rubbers, however, the proportion by weight of the end group is small and cannot, therefore, greatly influence the interaction between filler and rubber molecule. One object of the present invention is to prepare solution SBRs with a markedly higher content of effective groups for interaction with the filler.

Solution polybutadiene rubbers containing hydroxyl groups are also described in DE-OS 2,653,144. However, because their strength is too low, these rubbers are not suitable as the main component in tire treads.

EP-A 464,478 describes a process for the hydroxylation of rubbers, but this involves the introduction of secondary hydroxyl groups, which are far less effective than the primary hydroxyl groups of the present invention.

Emulsion and solution rubbers containing hydroxyl groups are also described in EP 806,452 A1, the hydroxyl contents described in this case for solution rubbers being in an appreciably lower range (0.009 to 0.061%) as a consequence of the process. The present invention shows that these contents have no significant effect on the wet grip.

SUMMARY OF THE INVENTION

It has now been found that rubber blends and vulcanized rubber products with surprisingly improved dynamic damping properties in the temperature range relevant to wet grip and in the temperature range relevant to rolling resistance, as well as improved abrasion behavior, can be prepared from solution vinylaromatic/diolefin rubbers containing hydroxyl groups with a bonded hydroxyl group, especially a primary hydroxyl group, content of 0.1 to 5 wt. % and a 1,2-vinyl content of 5 to 60 wt. %. Other surprising advantages were obtained when the rubber blend was prepared not in a kneader, as is customary, but by mixing a solution of rubber containing hydroxyl groups and oxide or silicate filler in an organic solvent, and then removing the solvent with steam, because in that case, the filler is completely precipitated with the rubber and does not remain in the effluent, as would be the case when using unmodified rubber.

BRIEF DESCRIPTION OF THE DRAWING

FIG. 1 shows the dynamic damping curves against temperature for Examples 5 and 8.

DETAILED DESCRIPTION OF THE INVENTION

Therefore, the present invention provides rubber blends containing one or more solution-polymerized rubbers containing hydroxyl groups, synthesized from diolefins and vinylaromatic monomers, wherein the solution-polymerized rubber(s) containing hydroxyl groups contain in the region of 0.1 to 5 wt. % of bonded hydroxyl groups, together with fillers and optionally other rubbers and rubber aids, and the use of said rubber blends for the manufacture of vulcanized rubber products, especially silica-filled tire treads with particularly high abrasion resistance, particularly, high wet grip and low rolling resistance.

The solution-polymerized vinylaromatic/diolefin rubbers advantageously have average molecular weights (number-average) of 50,000 to 2,000,000 and glass transition temperatures of −50° to +20° C.

The bonded hydroxyl groups are primary, secondary or tertiary, preferably primary or secondary.

Suitable vinylaromatic monomers are styrene, o-, m- and p-methylstyrene, p-tert-butylstyrene, α-methylstyrene, vinylnaphthalene, divinylbenzene, trivinylbenzene and divinylnaphthalene. Styrene is particularly preferred.

Suitable diolefins are especially 1,3-butadiene, isoprene, 1,3-pentadiene, 2,3-dimethylbutadiene, 1-phenyl-1,3-butadiene and 1,3-hexadiene. 1,3-Butadiene and isoprene are particularly preferred.

The preparation of the rubbers according to the present invention for the rubber blends is effected by anionic solution polymerization, i.e., by means of a catalyst based on an alkali metal, e.g., n-butyllithium, in a hydrocarbon as solvent. It is additionally possible to use the known randomizers and control agents for the microstructure of the polymer. Anionic solution polymerizations of this type are known and are described e.g., in I. Franta, Elastomers and Rubber Compounding Materials, Elsevier 1989, pages 73–74 and 92–94, and in Houben-Weyl, Methoden der Organischen Chemie (Methods of Organic Chemistry), Thieme Verlag, Stuttgart, 1987, volume E 20, pages 114 to 134. The primary hydroxyl groups are introduced in a subsequent reaction on the finished polymer. Methods of introducing the primary hydroxyl groups are, e.g., the addition of mercaptans containing primary hydroxyl groups, an addition reaction with formaldehyde, reaction with carbon monoxide followed by hydrogenation, and hydroboration of the vinyl groups of the L-SBRs followed by oxidative hydrolysis of the borane compound.

Examples of suitable alkali metal polymerization catalysts in terms of the present invention are lithium, sodium, potassium, rubidium, cesium metal and their hydrocarbon compounds and complex compounds with polar organic compounds.

Lithium and sodium hydrocarbon compounds having 2 to 20 carbon atoms are particularly preferred, examples being ethyllithium, n-propyllithium, i-propyllithium, n-butyllithium, sec-butyllithium, tert-octyllithium, n-decyllithium, phenyllithium, 2-naphthyllithium, 2-butylphenyllithium, cyclohexyllithium, 4-cyclopentyllithium, 1,4-dilithio-2-butene, sodium naphthalene, sodium biphenyl, potassium/tetrahydrofuran complex, potassium/diethoxyethane complex and sodium/tetramethyl-ethylenediamine complex. The catalysts can be used independently of one another or in a mixture.

Preferred amounts of catalysts are between 0.2 and 15 mmol/100 g polymer.

The anionic solution polymerization is carried out in a hydrocarbon or in another solvent which does not adversely affect the catalyst, for example tetrahydrofuran, tetrahydropyran or 1,4-dioxane. Examples of hydrocarbons which are suitable as solvents are aliphatic, cycloaliphatic or aromatic hydrocarbons having 2 to 12 carbon atoms. Preferred solvents are propane, butane, pentane, hexane, cyclohexane, propene, butene, 1-pentene, 2-pentene, 1-hexenes, 2-hexene, benzene, toluene and xylene. The solvents can be used on their own or as a mixture.

The hydroxyl groups are preferably introduced by means of an addition reaction with hydroxymercaptans of general formula (1) and/or mercaptocarboxylic acid esters containing hydroxyl groups of general formula (2). The reaction is preferably carried out in solution, optionally, in the presence of free radical initiators.

$$HS-R^1-OH \quad (1)$$

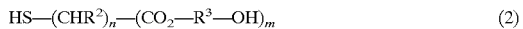

$$HS-(CHR^2)_n-(CO_2-R^3-OH)_m \quad (2)$$

wherein
$R^1$ is a linear, branched or cyclic $C_1$–$C_{36}$ alkyl group which can optionally be substituted by up to 6 further hydroxyl groups or can be interrupted by nitrogen, oxygen or sulfur atoms,
$R^2$ is hydrogen or a $C_1$–$C_6$ alkyl group,
$R^3$ is a linear, branched or cyclic $C_2$–$C_{36}$ alkyl group which can optionally be substituted by up to 6 further hydroxyl groups or can be interrupted by nitrogen, oxygen or sulfur atoms,
OH is a hydroxyl group, preferably primary
n is an integer from 1 to 5 and
m is an integer from 1 to 2.

Preferred hydroxymercaptans are mercaptoethanol, 1-mercapto-3-propanol, 1 -mercapto-4-butanol, α-mercapto-ω-hydroxyoligoethylene oxides, e.g., α-mercapto-ω-hydroxyoctaethylene glycol, or the corresponding ethylene oxide/propylene oxide copolyethers. Mercaptoethanol and α-mercapto-ω-hydroxyoligoethylene oxides are particularly preferred.

Preferred mercaptocarboxylic acid esters containing hydroxyl groups are esters of mercaptoacetic acid, mercaptopropionic acid and mercaptobutyric acid with ethylene glycol, propylene glycol, butylene glycol, diethylene glycol, triethylene glycol, tetraethylene glycol, octaethylene glycol, dipropylene glycol, tripropylene glycol, tetrapropylene glycol and N-methyldiethanolamine. The corresponding esters of mercaptoacetic acid and 3-mercaptopropionic acid are particularly preferred.

Suitable free radical initiators for the addition of the hydroxymercaptans onto the solution rubbers are, e.g., azo initiators such as azobisisobutyronitrile and azobiscyclohexanenitrile, and peroxides such as dilauroyl peroxide, benzpinacol silyl ether, or photoinitiators in the presence of UV or visible light. Diacyl peroxides, especially dilauroyl peroxide, didecanoyl peroxide, di(3,3,5-trimethylhexanol) peroxide, disuccinoyl peroxide and dibenzoyl peroxide, are particularly preferred.

Preferred amounts of free radical initiators are 0.5 to 10 wt. %, based on hydroxymercaptan.

The Mooney viscosity ML 1+4 of the copolymers is between 10 and 200, preferably 30 to 150, measured at 100° C.

The content of copolymerized 1,2-butadiene units ("vinyl content") is between 5 and 60 wt. %, preferably 10 to 50 wt. %.

The content of copolymerized vinylaromatic compound is between 5 and 40 wt. %, preferably 10 to 30 wt. %.

The content of hydroxyl groups is between 0.1 and 5 wt. %, preferably in the range 0.1 to 3 wt. %, particularly preferably in the range 0.3 to 2 wt. % and very particularly preferably in the range 0.5 to 2 wt. %, based on rubber.

The hydroxyl group content can be determined by known methods, e.g., by spectroscopy, titrimetry or elemental analysis or by determination of the so-called hydroxyl number (OH number), i.e., by reaction with reagents which eliminate titratable acids in contact with OH groups, cf. DIN 53240.

The solution-polymerized rubbers containing hydroxyl groups can be used on their own, extended with aromatic or aliphatic oils or blended with other rubbers. As well as natural rubber, synthetic rubbers are also suitable as additional rubbers for the manufacture of vulcanized rubber products. Examples of preferred synthetic rubbers are described by W. Hofmann, Kautschuktechnologie (Rubber Technology), Gentner Verlag, Stuttgart, 1980, and I. Franta, Elastomers and Rubber Compounding Materials, Elsevier, Amsterdam, 1989. They include inter alia:

BR—polybutadiene
ABR—butadiene/$C_1$–$C_4$ alkyl acrylate copolymers
CR—polychloroprene
IR—polyisoprene
SBR—styrene/butadiene copolymers with styrene contents of 1 to 60, preferably 20 to 50 wt. %
IIR—isobutylene/isoprene copolymers
NBR—butadiene/acrylonitrile copolymers with acrylonitrile contents of 5 to 60, preferably 10 to 40 wt. %
HNBR—partially hydrogenated or completely hydrogenated NBR
EPDM—ethylene/propylene/diene copolymers and blends of these rubbers. The following are of particular interest for the manufacture of motor vehicle tires with the aid of surface-modified fillers: natural rubber, emulsion SBRs and solution SBRs with a glass transition temperature above −50° C., which can optionally be modified with silyl ethers or other functional groups, such as those described, e.g., in EP-A 447,066, polybutadiene rubber with a high 1,4-cis content (>90%), which is prepared with catalysts based on Ni, Co, Ti or Nd, and polybutadiene rubber with a vinyl content of 0 to 75%, as well as blends thereof.

The rubber blends according to the invention contain 5 to 300 parts by weight of an active or inactive filler, e.g.,
  highly dispersed silicas, prepared, e.g., by the precipitation of silicate solutions or the flame hydrolysis of silicon halides, with specific surface areas of 5 to 1000, preferably 20 to 400 m²/g (BET specific surface area), and with primary particle sizes of 10 to 400 nm; the silicas can optionally also be present as mixed oxides with other metal oxides, such as those of Al, Mg, Ca, Ba, Zn, Zr and Ti;

synthetic silicates, such as aluminum silicate and alkaline earth metal silicate like magnesium silicate or calcium silicate, with BET specific surface areas of 20 to 400 m²/g and primary particle diameters of 10 to 400 nm;

natural silicates, such as kaolin and other naturally occurring silica;

glass fibers and glass fiber products (matting, extrudates) or glass microspheres;

metal oxides, such as zinc oxide, calcium oxide, magnesium oxide and aluminum oxide;

metal carbonates, such as magnesium carbonate, calcium carbonate and zinc carbonate;

metal hydroxides, e.g., aluminum hydroxide and magnesium hydroxide;

carbon blacks; the carbon blacks to be used here are prepared by the lamp black, furnace black or gas black process and have BET specific surface areas of 20 to 200 m²/g, e.g., SAF, ISAF, HAF, FEF or GPF carbon blacks;

rubber gels, especially those based on polybutadiene, butadiene/styrene copolymers, butadiene/acrylonitrile copolymers and polychloroprene.

Highly dispersed silicas and carbon blacks are particularly preferred.

The above-mentioned fillers can be used independently of one another or in a mixture. In one particularly preferred embodiment, the fillers present in the rubber blends consist of a mixture of light fillers, such as highly dispersed silicas and carbon blacks, the mixing ratio of light fillers to carbon blacks being 0.05 to 20, preferably 0.1 to 10.

The fillers are preferably added as solids or as a slurry in water or a solvent to a solution of the solution-polymerized rubber(s) containing hydroxyl groups. The rubber solution can be prepared beforehand, but the solution originating from the polymerization is preferably used directly. The solvent is then removed by heating or, preferably, with the aid of steam. The conditions of this stripping process can easily be determined by preliminary experiments.

As a further preference, the fillers are added to the solid rubber containing hydroxyl groups, or to a blend of rubbers, and incorporated in known manner, e.g., with a kneader.

For the preparation of the rubber blends, according to this invention, the content of hydroxyl groups in an amount from 0.1 to 5 wt. % is the crucial key-feature, the nature of the hydroxyl groups (primary, secondary or tertiary) or the nature of the rubber is a minor issue.

The rubber blends, according to the present invention, optionally, contain crosslinking agents as well. Crosslinking agents which can be used are sulfur or peroxides, sulfur being particularly preferred. The rubber blends according to the present invention can contain further auxiliary products for rubbers, such as reaction accelerators, anti-aging agents, heat stabilizers, light stabilizers, ozone stabilizers, processing aids, plasticizers, tackifiers, blowing agents, dyestuffs, pigments, waxes, extenders, organic acids, inhibitors, metal oxides, and activators, such as, triethanolamine, polyethylene glycol, hexanetriol, etc., which are known to the rubber industry.

It is particularly advantageous to use additional filler activators in the preferred rubber blends with highly active precipitated silicas. Preferred filler activators are sulfur-containing silyl ethers, especially bis(trialkoxysilylalkyl) polysulfides, as described in DE 2,141,159 and DE-AS 2,255,577, the oligomeric and/or polymeric sulfur-containing silyl ethers of DE-OS 4,435,311 and EP-A 670, 347, mercaptoalkyltrialkoxysilanes, especially mercaptopropyltriethoxysilane, and thiocyanatoalkylsilyl ethers, as described, e.g., in DE-OS 19,544,469.

The rubber aids are used in conventional amounts, which depend inter alia on the intended use. Conventional amounts are, e.g., from 0.1 to 50 wt. %, based on rubber.

The rubber blends according to the invention are outstandingly suitable for the production of all kinds of moldings.

Non-limiting examples of these moldings are O-rings, profiles, seals, membranes, tires, tire treads, damping elements and hosing. Tires and tire treads are particularly preferred.

The invention is further illustrated but is not intended to be limited by the following examples in which all parts and percentages are by weight unless otherwise specified.

EXAMPLE 1

25 g of 1-mercapto-2-ethanol and 1 g of dilauroyl peroxide are added at 70° C. to a solution of 500 g of Buna VSL 5025-0 solution SBR (Bayer AG, bonded styrene content 25 wt. %, 1,2-bonded butadiene content 50 wt. %) in 4 l of cyclohexane. The mixture was subsequently stirred for 16 hours at 70° C. 2.5 g of Vulkanox BKF antioxidant (Bayer AG) were then added and the solvent was distilled off with steam. After drying at 70° C. under vacuum, 525 g of a colorless rubber with a glass transition temperature (DSC) of −11° C., an OH number of 34 and an OH content of 1.04 wt. % were obtained.

Example 2
The procedure of Example 1 was repeated using the following amounts:

| Example | Buna VSL 5025-0 solution SBR | Hydroxy-mercaptan | Free radical initiator and reaction time | Glass transition temperature | OH content of the end product |
| --- | --- | --- | --- | --- | --- |
| 2 | 500 g | 12.5 g of 1-mercapto-2-ethanol | 0.2 g of azobiscyclo-hexanenitrile 16 hours/80° C. | −16° C. | 0.53 wt. % |

EXAMPLES 3 AND 4 (COMPARATIVE EXAMPLES)

As comparative examples, a solution SBR with a low hydroxyl group content and a solution SBR containing secondary hydroxyl groups were prepared with the aid of 1-mercapto-2-hydroxydodecane, known from EP 464,478. The same starting rubber was used. The procedure of Example 1 was repeated using the following amounts:

| Comparative Example | Buna VSL 5025-0 solution SBR | Hydroxy-mercaptan | Free radical initiator and reaction time | ML 1 + 4 | OH content of the end product |
|---|---|---|---|---|---|
| 3 | 500 g | 1.6 g of 1-mercapto-2-ethanol | 0.2 g of azobiscyclo-hexanenitrile 16 hours/80° C. | 52 | 0.07 wt. % |
| 4 (according to EP 464,478) | 500 g | 73.5 g of 1-mercapto-2-hydroxydodecane | 1 g of dilauroyl peroxide 3 hours/80° C. | 55 | 1.0 wt. % |

EXAMPLES 5–9

The following rubber blends (except for the sulfur and accelerator) were prepared at 140–150° C. (ejection temperature) in a 1.5 l kneader. Mixing time: 5 minutes. The sulfur and accelerator were incorporated at the end at approx. 50°–70° C. on a roller.

| Constituent | Comparative Example 5 | Comparative Example 6 | Comparative Example 7 | Example 8 | Example 9 |
|---|---|---|---|---|---|
| Buna VSL 5025-0 (Bayer AG) | 70 | 0 | 0 | 0 | 0 |
| Rubber according to Example 1 | 0 | 0 | 0 | 70 | 0 |
| Rubber according to Example 2 | 0 | 0 | 0 | 0 | 70 |
| Rubber according to Example 3 (Comparative) | 0 | 70 | 0 | 0 | 0 |
| Rubber according to Example 4 (Comparative) | 0 | 0 | 70 | 0 | 0 |
| Buna CB 25 | 30 | 30 | 30 | 30 | 30 |
| Vulkasil S (Bayer AG) | 70 | 70 | 70 | 70 | 70 |
| Silane Si 69 (Degussa) | 6 | 6 | 6 | 6 | 6 |
| Carbon black N121 (Degussa) | 10 | 10 | 10 | 10 | 10 |
| Zinc oxide RS (Bayer) | 2.5 | 2.5 | 2.5 | 2.5 | 2.5 |
| Stearic acid | 1 | 1 | 1 | 1 | 1 |
| Vulkanox 4020 (Bayer) | 1 | 1 | 1 | 1 | 1 |
| Sulfur | 1.5 | 1.5 | 1.5 | 1.5 | 1.5 |
| Vulkacit CZ | 1.8 | 1.8 | 1.8 | 1.8 | 1.8 |
| Vulkacit D | 2 | 2 | 2 | 2 | 2 |

The rubber blends were then vulcanized for 20 minutes at 170° C. The vulcanized products had the following properties:

| Property of vulcanized product | Comparative Example 5 | Comparative Example 6 | Comparative Example 7 | Example 8 | Example 9 |
|---|---|---|---|---|---|
| Tensile strength (MPa)[1] | 14.3 | 15.9 | 16.3 | 17.0 | 15.5 |
| Elongation at break (%)[1] | 350 | 365 | 380 | 340 | 330 |
| Tensile stress at 100% elongation (MPa)[1] | 3.1 | 3.2 | 3 | 3.4 | 3.4 |

-continued

The rubber blends were then vulcanized for 20 minutes at 170° C.
The vulcanized products had the following properties:

| Property of vulcanized product | Comparative Example 5 | Comparative Example 6 | Comparative Example 7 | Example 8 | Example 9 |
|---|---|---|---|---|---|
| Tensile stress at 300% elongation (%)[1] | 11.9 | 12.2 | 11.9 | 14.6 | 13.6 |
| Shore A hardness (23° C.)[2] | 71 | 70 | 69 | 73 | 69 |
| Shore A hardness (70° C.)[2] | 68 | 65 | 65 | 71 | 65 |
| Rebound resilience at 23° C. (%)[3] | 32 | 30 | 28 | 25 | 28 |
| Rebound resilience at 70° C. (%)[3] | 50 | 50 | 49 | 51 | 53 |
| Difference between rebound resiliences at 23° and 70° C. | 18 | 20 | 21 | 26 | 25 |
| Abrasion (DIN 53516) (ccm) | 93 | n.d. | | 87 | n.d. |

[1]determined by tensile testing according to DIN 52504 with standard bar 2
[2]determined according to DIN 53505
[3]determined according to DIN 53512

The experimental results show that the mechanical properties and the abrasion behavior have been improved compared with the unmodified rubber; also, the rebound resilience measured at room temperature was markedly lower, which is shown by experience to be associated with a considerable improvement in the wet grip. The difference between the rebound resiliences at room temperature and 70° C. is markedly greater in the case of the rubber blends according to the invention, so the relationship between the wet grip and the rolling resistance of the tire is also appreciably more favorable. The solution SBRs modified with few hydroxyl groups (rubber according to Example 3) and solution SBRs modified with secondary hydroxyl groups (rubber according to Example 4), as in the known state of the art, lie in the difference between the rebound resiliences at room temperature and 70° C. in the region of the unmodified rubbers, so the relationship between the wet grip and the rolling resistance of the tire is not significantly improved here.

The dynamic damping behavior of the vulcanized rubber products in the temperature range from approx. −10 to +80° C. is of particular importance for evaluating the rolling resistance and wet grip behavior. The damping is required to be as high as possible at −10° to +10° C. and as low as possible in the temperature range from 50° to 80° C. FIG. 1 below shows the dynamic damping curves against temperature, measured by means of a Roehlig instrument (DIN 53513). It is clearly seen that the vulcanized product according to the present invention is superior in the higher temperature range relevant to rolling resistance and also in the low temperature range relevant to wet grip.

EXAMPLES 10 (COMPARATIVE EXAMPLE) AND 11

The following rubber blends (except for the sulfur and accelerator) were prepared at 140°–150° C. (ejection temperature) in a 1.5 l kneader. Mixing time: 5 minutes. The sulfur and accelerator were incorporated at the end at approx. 50°–70° C. on a roller.

| Constituent | Comparative Example 10 | Example 11 |
|---|---|---|
| Buna VSL 5025-0 (Bayer AG) | 70 | 0 |
| Rubber according to Example 1 | 0 | 70 |
| Buna CB 25 | 30 | 30 |
| Corax N 121 carbon black (Degussa AG) | 50 | 50 |
| Aromatic mineral oil | 5 | 5 |
| Antilux 654 ozone stabilizing wax (Rheinchemie) | 1 | 1 |
| Zinc oxide RS (Bayer) | 3 | 3 |
| Stearic acid | 2 | 2 |
| Vulkanox 4020 antioxidant (Bayer AG) | 1 | 1 |
| Vulkanox HS antioxidant (Bayer AG) | 1 | 1 |
| Sulfur | 1.7 | 1.7 |
| Vulkacit CZ | 1.4 | 1.4 |
| Vulkacit D | 0.3 | 0.3 |

The rubber blends were then vulcanized for 10 minutes at 170° C. The vulcanized products had the following properties:

| Property of vulcanized product | Comparative Example 10 | Example 11 |
|---|---|---|
| Tensile strength (MPa)[1] | 18.9 | 20.8 |
| Elongation at break (%)[1] | 358 | 353 |
| Tensile stress at 100% elongation (MPa)[1] | 3.1 | 3.2 |
| Tensile stress at 300% elongation (%)[1] | 15.0 | 16.9 |
| Shore A hardness (23° C.)[2] | 73 | 71 |

-continued

| Property of vulcanized product | Comparative Example 10 | Example 11 |
|---|---|---|
| Shore A hardness (70° C.)<sup>(2)</sup> | 66 | 65 |
| Rebound resilience at 23° C. (%)<sup>(3)</sup> | 34 | 27 |
| Rebound resilience at 70° C. (%)<sup>(3)</sup> | 50 | 50 |
| Difference between rebound resiliences at 23° and 70° C. | 16 | 23 |
| Tear resistance N/mm | 14.9 | 23 |

The test results of Examples 10 and 11 clearly show that the favorable effects according to the invention in terms of the damping behavior are not restricted to silica-filled rubber blends but, surprisingly, are also to be found in black-filled rubber blends.

EXAMPLE 12

Preparation of a Rubber Blend of Silica and a Solution of a Rubber Containing 1 wt. % of Hydroxyl Groups 25 g of mercaptoethanol and 1 g of azobiscyclohexanenitrile were added to a solution of 500 g of Buna VSL 5025-0 (solution styrene/butadiene rubber with a styrene content of 25 wt. % and a 1,2-vinyl content of 50 wt. %, from Bayer AG) and the mixture was heated for 16 hours at 80° C. 2.5 g of Vulkanox BKF (phenolic antioxidant from Bayer AG), 420 g of Vulkasil S (highly active precipitated silica with a BET specific surface area of 160–200 m²/g, from Bayer AG) and 196.9 g of Renopal 450 (aromatic mineral oil from Fuchs Mineralölwerke) were then stirred in at 70° C. and the solvent was distilled off by introducing steam. This gave a silica/rubber blend in which the silica was homogeneously distributed. The effluent was clear and free of silica. The moist silica/rubber blend was dried at 70° C. under vacuum. The yield of dried rubber blend was 1107 g (97% of theory).

EXAMPLE 13 (COMPARATIVE EXAMPLE)

Preparation of a Rubber Blend of Silica and a Solution of a Rubber Without Hydroxyl Groups.

500 g of Buna VSL 5025-0 (solution styrene/butadiene rubber with a styrene content of 25 wt. % and a 1,2-vinyl content of 50 wt. %, from Bayer AG) and 2.5 g of Vulkanox BKF (phenolic antioxidant from Bayer AG) are dissolved in 4 l of cyclohexane. 500 g of Vulkasil S (highly active precipitated silica with a BET specific surface area of 160 to 200 m²/g, from Bayer AG) are then added, the mixture is subsequently homogenized by stirring for 45 minutes at 70° C. and the solvent is then driven off with steam at 100–110° C. This gave a residue of rubber containing little silica. The bulk of the silica had collected in the effluent.

EXAMPLE 14 (COMPARATIVE EXAMPLE)

Preparation of a Rubber Blend of Silica and a Solution of a Rubber Containing 0.07 wt. % of Hydroxyl Groups 1.55 g of mercaptoethanol and 0.5 g of azobiscyclohexanenitrile are added to a solution of 500 g of Buna VSL 5025-0 (solution styrene/butadiene rubber with a styrene content of 25 wt. % and a 1,2-vinyl content of 50 wt. %, from Bayer AG) and the mixture is heated for 16 hours at 80° C. 2.5 g of Vulkanox BKF (phenolic antioxidant from Bayer AG), 401.2 g of Vulkasil S (highly active precipitated silica with a BET specific surface area of 160–200 m²/g, from Bayer AG) and 188.1 g of Renopal 450 (aromatic mineral oil from Fuchs Mineralölwerke) were then stirred in at 70° C. and the solvent was distilled off by introducing steam. This gave a rubber-containing residue containing little silica. The bulk of the silica had collected in the effluent and was separated off by sieving. The rubber-containing residue was dried at 70° C. under vacuum to give 821 g (75% of theory).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of rubber blends containing one or more solution-polymerized rubber comprising hydroxyl groups, synthesized from diolefins and vinylaromatic monomers, wherein said at least one solution-polymerized rubber containing primary hydroxyl groups contain in the range of 0.1 to 5 wt. % of bonded hydroxyl groups, comprising the steps of a) adding to a solution of, said at least one solution-polymerized rubber containing hydroxyl groups, one or more fillers, in amounts ranging from 0.5 to 500 parts by weight, based on 100 parts by weight of rubber, and optionally other working-up and/or processing and/or stabilizing aids, and b) removing the solvent.

2. A process according to claim 1, wherein said solvent is removed with the aid of steam.

3. A molded part comprising rubber blends containing at least one solution-polymerized rubber comprising hydroxyl groups, synthesized from diolefins and vinylaromatic monomers, wherein said at least one solution-polymerized rubber containing primary hydroxyl groups contain in the range of 0.1 to 5 wt. % of bonded hydroxyl groups.

4. A tire comprising rubber blends containing at least one solution-polymerized rubber comprising hydroxyl groups, synthesized from diolefins and vinylaromatic monomers, characterized in that said at least one solution-polymerized rubber containing primary hydroxyl groups contain in the range of 0.1 to 5 wt. % of bonded hydroxyl groups.

5. A tire tread comprising rubber blends containing at least one solution-polymerized rubber comprising hydroxyl groups, synthesized from diolefins and vinylaromatic monomers, characterized in that said at least one solution-polymerized rubber(s) containing primary hydroxyl groups contain in the range of 0.1 to 5 wt. % of bonded hydroxyl groups.

* * * * *